(12) United States Patent
Halberstadt

(10) Patent No.: US 9,997,996 B1
(45) Date of Patent: Jun. 12, 2018

(54) POWER CONVERTER SYSTEM AND METHOD FOR OPERATING A POWER CONVERTER SYSTEM

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/600,486

(22) Filed: May 19, 2017

(51) Int. Cl.
*H02M 1/00* (2006.01)
*H02M 1/42* (2007.01)
*H02M 3/158* (2006.01)
*H02M 3/337* (2006.01)
*H02M 3/335* (2006.01)
*G05F 1/575* (2006.01)
*G05F 1/618* (2006.01)
*G05F 1/62* (2006.01)

(52) U.S. Cl.
CPC .......... *H02M 1/4241* (2013.01); *G05F 1/575* (2013.01); *G05F 1/618* (2013.01); *G05F 1/62* (2013.01); *H02M 1/42* (2013.01); *H02M 3/1582* (2013.01); *H02M 3/3376* (2013.01); *H02M 3/33546* (2013.01); *H02M 2001/0022* (2013.01); *H02M 2001/0058* (2013.01)

(58) Field of Classification Search
None
See application file for complete search history.

(56) References Cited

U.S. PATENT DOCUMENTS

| 8,467,199 | B2 | 6/2013 | Lee et al. |
| 8,681,513 | B2 | 3/2014 | Reddy |
| 8,842,450 | B2 | 9/2014 | Jungreis et al. |
| 8,957,542 | B2 | 2/2015 | Dighrasker et al. |
| 9,461,554 | B2 | 10/2016 | Fu et al. |
| 2011/0090717 | A1 | 4/2011 | Lee et al. |
| 2011/0317459 | A1 | 12/2011 | Kuebrich et al. |
| 2012/0008350 | A1 | 1/2012 | Kuebrich et al. |
| 2013/0003430 | A1* | 1/2013 | Reddy ............... H02M 3/337 363/74 |
| 2015/0016159 | A1 | 1/2015 | Deboy |
| 2016/0016479 | A1* | 1/2016 | Khaligh ............. B60L 11/1812 363/17 |

(Continued)

OTHER PUBLICATIONS

Sony M, et al.; "Comparative Study of Modes Non-Inverting Buck Boost Power Factor Correction Converter"; International Journal of Engineering Research and General Science vol. 3, Issue 6; 10 pages Nov.-Dec. 2015.

*Primary Examiner* — Adolf Berhane
*Assistant Examiner* — Henry Lee, III

(57) ABSTRACT

Techniques for operating a power converter system that includes an LLC resonant converter and a non-inverting buckboost converter that is located in front of the LLC resonant converter are disclosed. In an embodiment, the output voltage of a non-inverting buckboost converter is regulated in response to the input voltage and the output voltage of an LLC resonant converter in order to maintain a desired ratio between the input voltage and the output voltage of the LLC resonant converter. For example, the ratio between the input voltage and the output voltage of the LLC resonant converter is controlled to a desired ratio that matches the turns ratio of the LLC resonant converter's transformer and that may also match (as a second order effect) the ratio of Lr to Lm.

15 Claims, 19 Drawing Sheets

(56) References Cited

U.S. PATENT DOCUMENTS

2016/0094135 A1 3/2016 Dai et al.
2016/0094136 A1 3/2016 Fu et al.
2016/0149501 A1 5/2016 Dai et al.

* cited by examiner

POWER CONVERTER SYSTEM AND METHOD FOR OPERATING A POWER CONVERTER SYSTEM

FIELD OF THE INVENTION

The invention relates generally to power converters.

BACKGROUND

Power converters are used with many types of electronic devices. Some devices receive power from a mains source, such as an AC mains, some devices receive power from a battery, and other devices may receive power from an AC mains and from a battery. Power converters are used to converter a power source to a level is needed by the load.

SUMMARY

In accordance with an embodiment of the invention, the output voltage of a non-inverting buckboost converter is regulated in response to the input voltage and the output voltage of an LLC resonant converter in order to maintain a desired ratio between the input voltage and the output voltage of the LLC resonant converter. For example, the ratio between the input voltage and the output voltage of the LLC resonant converter is controlled to a desired ratio that matches the turns ratio of the LLC resonant converter's transformer and that may also match (as a second order effect) the ratio of Lr to Lm.

In an embodiment in accordance with the invention, a method for operating a power converter system that includes an LLC resonant converter and a non-inverting buckboost converter that is located in front of the LLC resonant converter involves identifying a desired ratio of the input to output voltage of the LLC resonant converter and regulating the output of the non-inverting buckboost converter based on the desired ratio of the input to output voltage of the LLC resonant converter.

In an embodiment of the method, regulating the output of the non-inverting buckboost converter comprises determining a ratio of the input voltage to the output voltage of the LLC resonant converter.

In an embodiment of the method, regulating the output of the non-inverting buckboost converter comprises generating a control signal in response to a comparison of the determined ratio to the fixed ratio.

In an embodiment, the method involves regulating the non-inverting to buckboost converter in response to a rectified AC mains voltage that is input to the non-inverting buckboost converter.

In an embodiment, the method involves regulating the non-inverting buckboost converter in response to the phase angle of the rectified AC mains voltage.

In an embodiment, the method involves regulating the buckboost converter in response to the amplitude and the phase angle of the rectified AC mains voltage.

In an embodiment, the method involves halting switching of switches within the non-inverting buckboost converter in response to a rectified AC mains voltage that is input to the non-inverting buckboost converter.

In an embodiment, the method involves adjusting a parameter of the LLC resonant converter in response to a comparison between the output of the LLC resonant converter and a reference to regulate the LLC resonant converter.

In an embodiment of the method, adjusting a parameter of the LLC resonant converter involves adjusting a capacitor voltage of the LLC resonant converter.

In an embodiment of the method, adjusting a parameter of the LLC resonant converter involves adjusting a frequency of the LLC resonant converter.

In an embodiment of the method adjusting a parameter of the LLC resonant converter involves selecting a low power mode when an output of the LLC resonant converter falls below a power level threshold.

Another method for operating a power converter system that includes an LLC resonant converter and a non-inverting buckboost converter that is located in front of the LLC resonant converter is disclosed. The method involves identifying a desired ratio of the input to output voltage of the LLC resonant converter and regulating the output of the non-inverting buckboost converter based the output voltage at the LLC resonant converter to maintain the desired ratio of the input to output voltage of the LLC resonant converter.

In an embodiment of the method, regulating the output of the non-inverting buckboost converter involves determining a ratio of the input voltage to the output voltage of the LLC resonant converter.

In an embodiment of the method, regulating the output of the non-inverting buckboost converter involves generating a control signal in response to a comparison of the determined ratio to the desired ratio.

In an embodiment, the method involves regulating the non-inverting buckboost converter in response to a rectified AC mains voltage that is input to the non-inverting buckboost converter.

In an embodiment, the method involves regulating the non-inverting buckboost converter in response to the phase angle of the rectified AC mains voltage.

In an embodiment, the method involves regulating the buckboost converter in response to the amplitude and the phase angle of the rectified AC mains voltage.

A power converter system is disclosed. The power converter system includes a non-inverting buckboost converter, an LLC resonant converter, and a ratio detector to detect a ratio between an input voltage of the LLC resonant converter and an output voltage of the LLC resonant converter and to provide a control signal to the non-inverting buckboost converter. The non-inverting buckboost converter is configured to regulate the output of the non-inverting buckboost converter based on the control signal and the desired ratio of the input to output voltage of the LLC resonant converter.

In an embodiment of the system, the non-inverting buckboost converter is configured to regulate the output of the non-inverting buckboost converter to maintain the fixed ratio of the input to output voltage of the LLC resonant converter.

In an embodiment, the system includes a mode detector to generate a mode control signal in response to a rectified AC mains voltage and an output voltage of the non-inverting buckboost converter.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION

Figure 1:
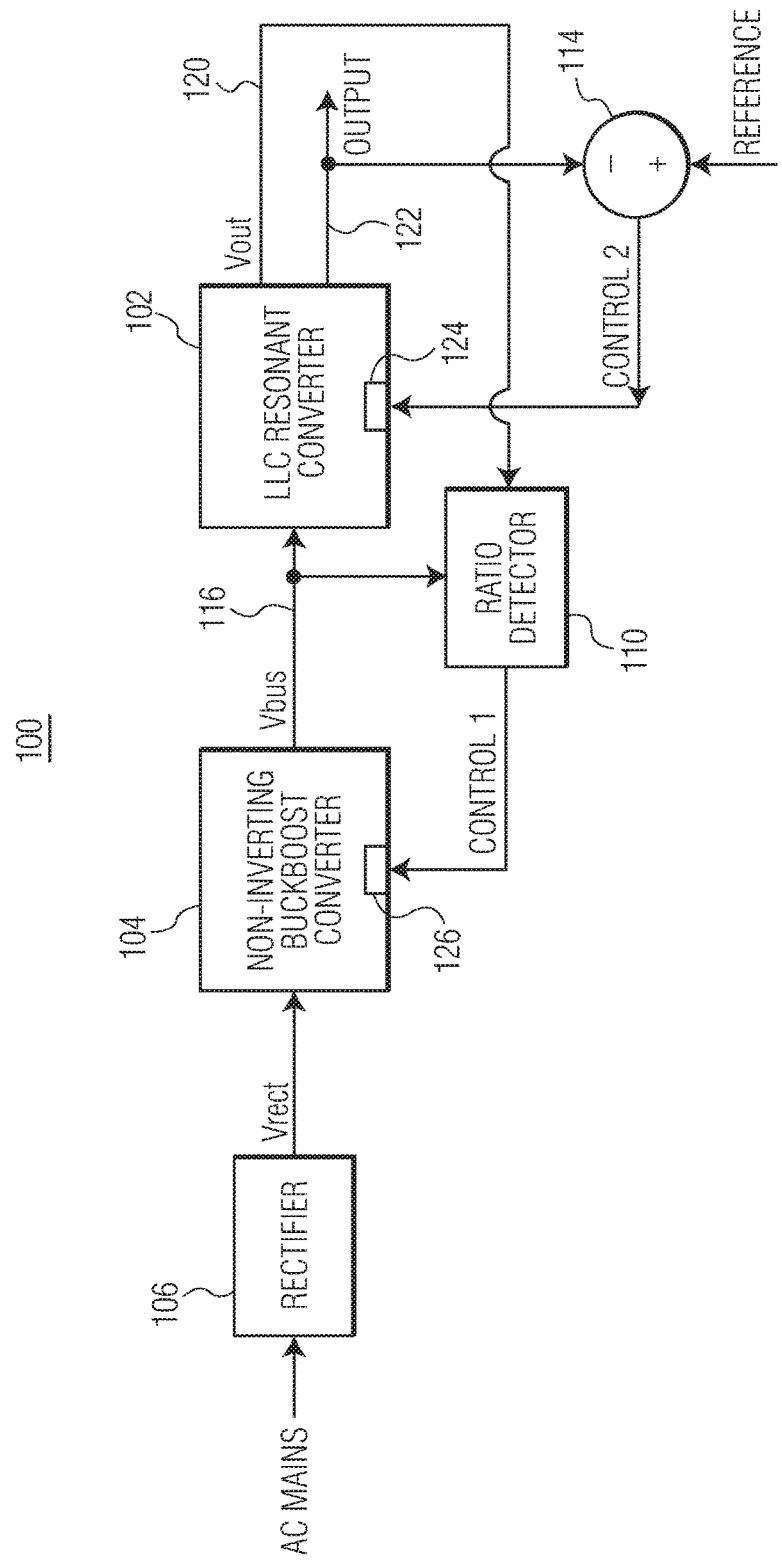
FIG. 1 depicts an embodiment of a power converter system that includes an LLC resonant converter and a non-inverting buckboost converter that is located in front of the LLC resonant converter.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

For power converters operating at powers larger than approx 100 Watts at full load, a resonant topology may be used due to the resonant topology's characteristically high efficiency and small volume/high power density. At such power levels, generally an inductor-inductor-capacitor (LLC) resonant converter is used because of its high efficiency and power density.

In an LLC resonant converter, a resonant capacitor, Cr, resonates with a resonant inductor, Lr. Additionally, the magnetizing inductance of a transformer, Lm, can also take part in the resonance. An optimal efficiency is typically reached when the ratio between the input voltage and the output voltage of the LLC resonant converter is matched to the transformer's turns ratio and (as a second order effect) to the ratio of Lr and Lm. In a case of optimal matching, the resulting output current exhibits almost sinusoidal half cycles, where both the voltage at the half bridge node, Vhb, and the current in the output capacitor are in phase and flowing during each complete half-cycle. Less optimal performance occurs when the ratio of input voltage to output voltage (Vbus/Vout) is much larger than the optimal or when the ratio of input voltage to output voltage (Vbus/Vout) is much smaller than the optimum. In such cases, the efficiency of the LLC resonant converter may be lower because of larger primary currents resulting in more losses (e.g., when the ratio of input voltage to output voltage (Vbus/Vout) is much larger than the optimal) or because of larger root-mean-square (RMS) currents due to the non-optimal current shape (e.g., when the ratio of input voltage to output voltage (Vbus/Vout) is much smaller than the optimum).

For cases in which the power is above 75 Watts, power factor correction (PFC) may be needed. Typically, a boost converter is used for this purpose. A boost converter makes it possible to draw an almost sinusoidal current from a rectified mains voltage and to generate a fixed intermediate voltage as an input for an LLC resonant converter. The sinusoidal current can be drawn by selecting the optimal combination of on time of a boost converter switch and switching period. Thus, it is possible to set the optimum input voltage for a LLC resonant converter in combination with a predefined turns ratio for the LLC resonant converter such that an optimal efficiency occurs for a desired output voltage. For lower power ranges (e.g., below about 75 Watts maximum load), flyback topology is often used as it is relatively inexpensive and simple. However, efficiency and power density characteristics of the flyback topology may not be suitable for certain applications. A resonant topology may be considered, but a resonant topology may not support a universal mains input due to the sensitivity to input/output voltage of the resonant stage. As for the lower power ranges, power factor correction is not needed, and thus, adding a boost converter may unnecessarily increase cost.

Another issue with resonant topology is that for low mains operation, the rectified AC mains voltage becomes 0V at the mains zero crossings. The bus electrolytic capacitor (elcap) therefore should have a relatively large value in order to keep the intermediate voltage from dropping too much as power needs to be delivered from the bus elcap instead of from the mains inlet. In practice, this gives voltage drop at Vbus down to 60V for low mains situation (e.g., low mains is, for example, 110V AC). This can further complicate design of an LLC resonant converter at least because the ratio of the input voltage to the output voltage becomes even larger.

For mobile charging equipment, a need to support a universal mains input and a need to be compatible with USB power delivery (USBPD) makes it even more difficult to use an LLC resonant converter, due to the sensitivity of the LLC resonant converter to changing input voltage and output voltage. For USBPD, the desired output voltage can be 5V, 9V, 12V and optionally also 20V. Mobile phones can also be charged using direct charging. Thus, a charger is directly connected by a switch to the battery of the phone. In common cases, the battery voltage can vary between 3V and 6V depending on the charge state of the battery.

Adding a boost converter in front of the LLC resonant converter may allow for a more optimal operation for the LLC resonant converter, however, if USBPD and/or direct charging is also needed, even with a fixed input voltage, it is difficult, if not impossible, to achieve sufficiently high efficiency and power density for the total system. This is in part because the boost converter is limited to producing an output voltage above the peak voltage of the mains, due to the rectifier and inductor between the input and the output. This would require a very large intermediate voltage in the range of up to four times the peak voltage of the mains in order to get the LLC resonant converter operating at the optimal operating point for high output voltages. Without such an optimal operation, using both a boost converter and an LLC resonant converter may not provide an improvement over flyback topology.

Buckboost topology is generally known and is typically used for low voltage DC-DC conversion. Often times, such a DC-DC converter is supplied from a battery and the output voltage can be lower or higher than the battery voltage. Buckboost converters have been used in conjunction with an LLC resonant converter although the applications have been limited.

In accordance with an embodiment of the invention, the output voltage of a non-inverting buckboost converter is regulated in response to the input voltage and the output voltage of an LLC resonant converter in order to maintain a desired ratio between the input voltage and the output voltage of the LLC resonant converter. In an embodiment, the output voltage of the non-inverting buckboost converter is regulated to maintain a constant ratio between the input voltage and the output voltage of the LLC resonant converter. For example, the ratio between the input voltage and the output voltage of the LLC resonant converter is maintained at a value that matches the turns ratio of the LLC resonant converter's transformer and may additionally match (as a second order effect) the ratio of Lr to Lm. The non-inverting buckboost converter may also be regulated in response to the AC mains voltage and the output of the buckboost converter in order to improve the efficiency of the non-inverting buckboost converter. Further, the output power of the LLC resonant converter may be regulated to provide power control to protect against under and over shoot. In an embodiment, the LLC resonant converter may also use a low power mode at low load levels to obtain higher efficiency for the LLC resonant converter at low loads. Using the above described techniques, a power converter system can efficiently convert up and convert down depending on needs and conditions. This allows a normal input voltage (e.g., below 450V) to the LLC resonant converter while still having the ability to achieve a highly efficient operating point for the LLC resonant converter for a desired low output voltage by lowering the input voltage to the LLC resonant converter below the peak voltage of the rectified AC mains. For higher power applications, the technique allows for power factor correction, including setting the input voltage range to be above or below the peak of the rectified AC mains, such that USBPD output voltage specifications can be realized with optimal efficiency. Thus, the above-described technique enables a power converter system that supports USBPD or direct charging in combination with a universal mains.

FIG. 1 depicts an embodiment of a power converter system 100 that includes an LLC resonant converter 102 and a non-inverting buckboost converter 104 that is located in front of the LLC resonant converter. The power converter system also includes a rectifier 106, a ratio detector 110, and a compare module 114. The rectifier is configured to receive an AC mains as an input and to provide a rectified AC mains as the output, which output is provided as an input to the non-inverting buckboost converter. In an embodiment, the AC mains may be in the range of 80-264V AC. In one case, a relatively high AC mains voltage is in the range of about 190-264V AC and a relatively low AC mains voltage is in the range of about 80-120V AC. In an embodiment, the rectifier is a conventional rectifier as is known in the field, however, other embodiments of the rectifier are possible including an "active" rectifier that utilizes at least some switches. The output of the rectifier is referred to as the rectified AC mains voltage, Vrect, and is provided as an input to the non-inverting buckboost converter.

The non-inverting buckboost converter 104 converts the rectified AC mains voltage, Vrect, to a voltage that is output onto a bus 116 between the non-inverting buckboost converter and the LLC resonant converter 102 and is referred to herein as the bus voltage, Vbus. Example embodiments of the non-inverting buckboost converter are described below with reference to FIGS. 3A and 3B. When the non-inverting buckboost converter operates as a buck converter, the bus voltage, Vbus, is made to be lower than the rectified mains voltage, Vrect, such that the Vbus<Vrect. When the non-inverting buckboost converter operates as a boost converter, the bus voltage, Vbus, is made to be higher than the rectified mains voltage, Vrect, such that Vbus>Vrect. As is described in more detail below, the non-inverting buckboost converter is controlled at least in part by a control signal received from the ratio detector.

The LLC resonant converter 102 converts the bus voltage, Vbus, to an output voltage, Vout, that is provided on output 120. The output voltage, Vout, is connected to a load (not shown), which may include a battery and/or circuits, etc., as is known in the field. FIG. 1 also depicts an output 122 of the LLC resonant converter that is used in a feedback loop to regulate the LLC resonant converter. In an embodiment, the output may be, for example, characterized in terms of voltage, a current, or power. In an embodiment, the output 122 is the output voltage, Vout. The output can be compared to a reference signal, reference, at the compare module 114 and a control signal, control2, can be provided to the LLC resonant converter at a control input 124, control input 2. An example embodiment of the LLC resonant converter is described below with reference to FIG. 9.

The output voltage, Vout, of the LLC resonant converter 102 is fed back to the ratio detector 110. The ratio detector is configured to generate a control signal, control1, which is provided to the non-inverting buckboost converter 104 at a control input 126, control input 1, and used to control the non-inverting buckboost converter. As described above, an LLC resonant converter may achieve optimal performance when the ratio between the bus voltage, Vbus, and the output voltage, Vout, matches the turns ratio of the LLC resonant converter's transformer and optionally also matches (as a second order effect) the ratio of Lr to Lm. Thus, in an embodiment, the control signal is generated to maintain the ratio between the bus voltage, Vbus, and the output voltage, Vout, at a constant value, in particular, at a value that matches the turns ratio of the LLC resonant converter's transformer and that matches (as a second order effect) the ratio of Lr to Lm. In an embodiment, the actual ratio of the output voltage, Vout, to the bus voltage, Vbus is compared to the desired ratio of the output voltage, Vout, to the bus voltage, Vbus, and the non-inverting buckboost converter is controlled in response to the comparison. As Vbus can now be regulated to a fixed value while drawing power from the AC mains also when the momentary mains voltage is below Vbus, the bus elcap can have a much lower value compared to a single stage solution, which may provide a cost advantage over a single stage solution.

In an embodiment, the control signal, control1, is a function of the ratio between the bus voltage, Vbus, and the output voltage, Vout, which can be expressed as:

$$\text{control1}=(F)(V\text{out}/V\text{bus})$$

In an embodiment, the control signal, control1, is generated as:

$$\text{control1}(V\text{bus},V\text{out})=1-k1\cdot(V\text{out}/V\text{bus});$$

where k1 is a scaling factor that is a function of the desired ratio of Vout/Vbus, which functions to scale the ratio of Vout/Vbus.

Figure 2A:
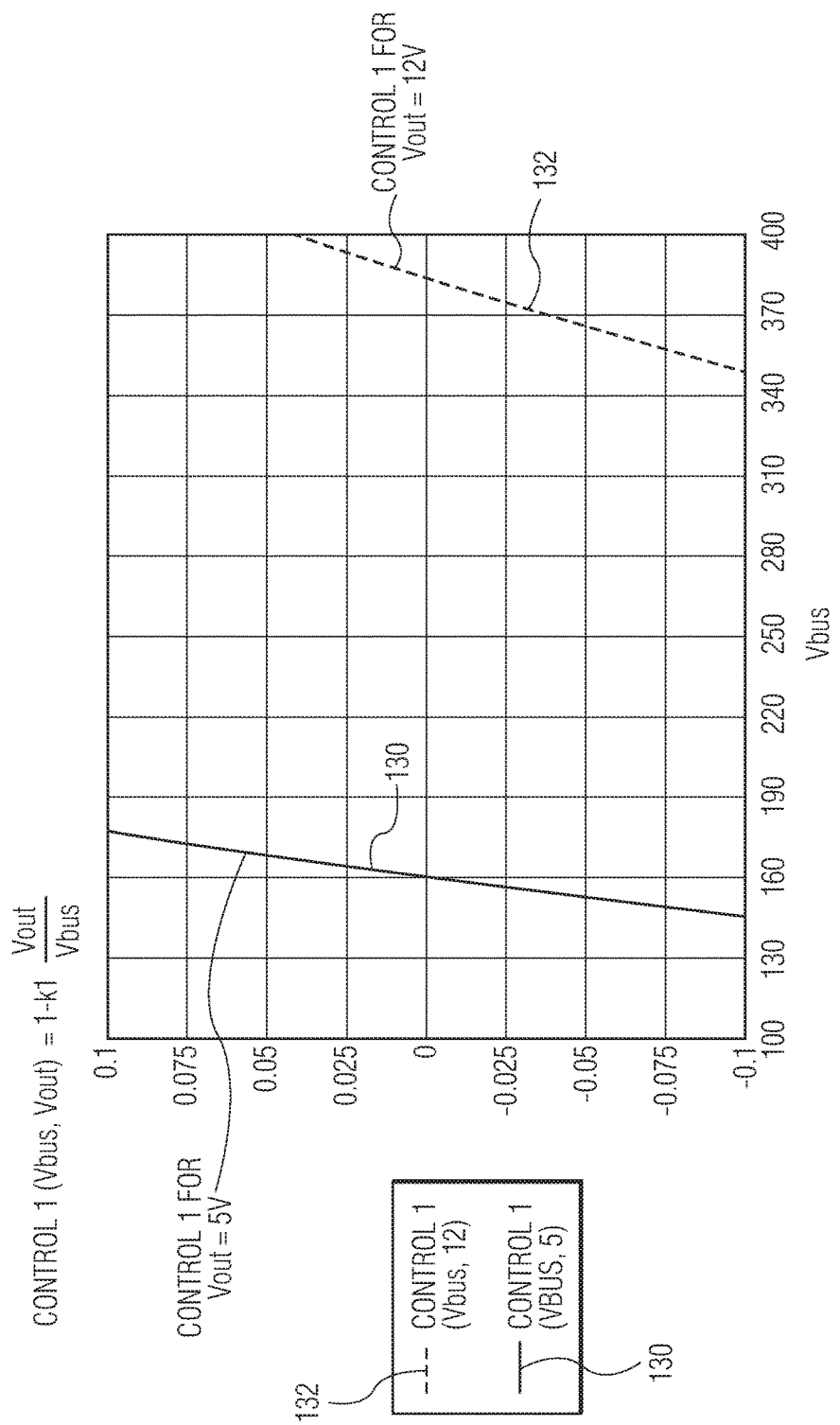
FIG. 2A depicts a graph of an example control signal, control1, for two cases where the desired output voltage, Vout, is 5V and 12V, respectively.

FIG. 2A depicts a graph of an example control signal, control1, for two cases where the desired output voltage, Vout, is 5V and 12V, respectively. In the graph of FIG. 2A, line 130 corresponds to the control signal in the case where the desired output voltage, Vout, is 5V and line 132 corresponds to the control signal in the case where the desired output voltage, Vout, is 12V.

In an embodiment, it may be desirable to further scale the control signal to obtain similar sensitivity of the control signal versus the voltage ratio (Vout/Vbus) for both of the two cases. Thus, in another embodiment, the control signal is generated as:

$$\text{control1}(V\text{bus},V\text{out},k2)=(1-k1\cdot(V\text{out}/V\text{bus}))\cdot k2;$$

where k2 is an additional scaling factor.

Figure 2B:
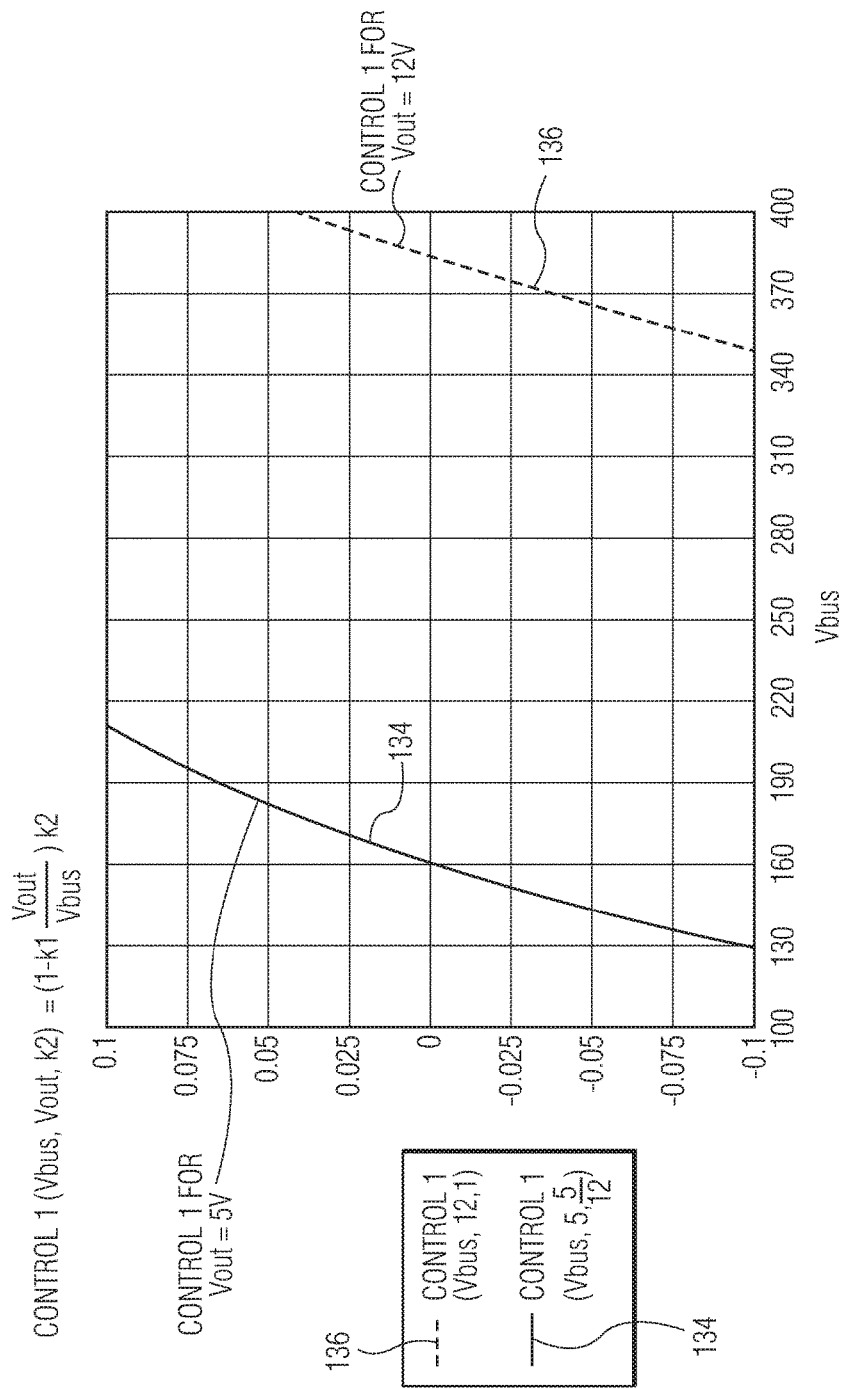
FIG. 2B depicts another graph of the control signal, control1, for the two cases where the desired output voltage, Vout, is 5V and 12V, respectively, in which an additional scaling factor is used.

FIG. 2B depicts a graph of the control signal, control1, for the two cases where the desired output voltage, Vout, is 5V and 12V. In the graph of FIG. 2B, line 134 corresponds to the control signal in the case where the desired output voltage, Vout, is 5V and line 136 corresponds to the control signal in the case where the desired output voltage, Vout, is 12V. As indicated in FIG. 2B, the scaling factor, k2, is set at "1" in the case where the desired output voltage, Vout, is 5V and is set at "5/12" in the case where the desired output voltage, Vout, is 12V. When compared to the graph of FIG. 2A, it can be seen in the graph of FIG. 2B that a less sensitive control signal, control1, is generated in the case of Vout=5V such that sensitivity from Vbus to control1 is equal for both 5V and 12V.

Referring back to FIG. 1, the ratio detector 110 may be embodied in analog circuits, digital circuits, or a combination of analog and digital circuits. In an embodiment, the ratio detector includes a circuit to calculate the ratio between the analog voltage signals of Vbus and Vout (e.g., Vout/Vbus). In another embodiment, the ratio detector includes analog-to-digital (A/D) converters that convert Vbus and Vout to digital signals that are then used to generate the control signal, control 1. In an embodiment, the scaling factor(s), k1 and/or k2, could be programmed into the system, e.g., into the ratio detector. In another embodiment, the scaling factor(s), k1 and/or k2, could be pre-configured and fixed within the system.

As illustrated in FIG. 1, the control signal, control1, is provided from the ratio detector 110 to the non-inverting buckboost converter 104 at the control input 126. The control signal, control1, is used to control the non-inverting buckboost converter to influence the magnitude of the output voltage, Vbus. In an embodiment, the control signal, control1, is used to control the timing of switches within the non-inverting buck boost converter to maintain the ratio between the bus voltage, Vbus, and the output voltage, Vout, of the LLC resonant converter 102 at a constant value, in particular, a constant value that matches the turns ratio of the LLC resonant converter's transformer and may additionally match (as a second order effect) the ratio of Lr to Lm.

Figure 3A:
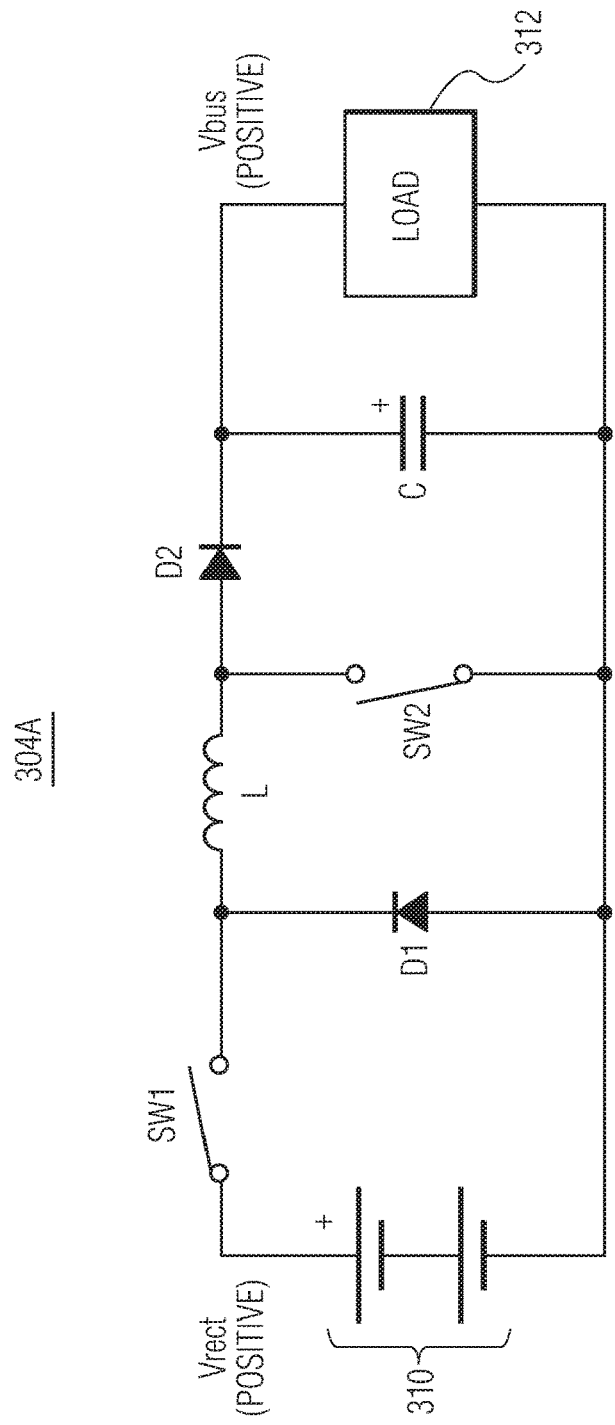
FIG. 3A depicts an expanded view of an embodiment of the non-inverting buckboost converter of FIG. 1.
Figure 3B:
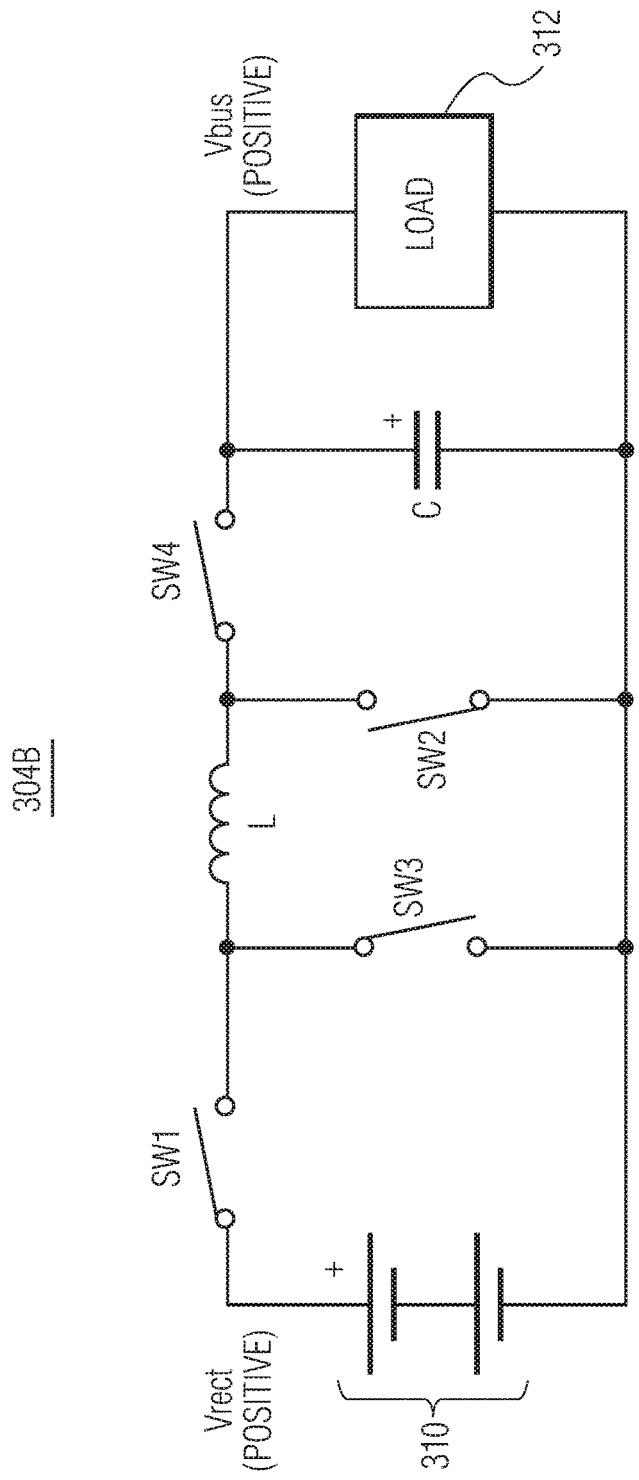
FIG. 3B depicts an expanded view of another embodiment of the non-inverting buckboost converter of FIG. 1.

FIG. 3A depicts an expanded view of an embodiment of the non-inverting buckboost converter 104 of FIG. 1. In the embodiment of FIG. 3A, the non-inverting buckboost converter 304A has an input voltage (e.g., represented as voltage source 310) of the rectified AC mains voltage, Vrect, and an output voltage of the bus voltage, Vbus. The output voltage, Vout, of the non-inverting buckboost converter is provided to a load 312, which in this case is the LLC resonant converter. The non-inverting buckboost converter includes a first switch, SW1, a second switch, SW2, a first diode, D1, a second diode, D2, an inductor, L, and a capacitor, C. Operation of the non-inverting buckboost converter in buck mode may involve keeping the second switch, SW2, off (i.e., open) and using the first switch, SW1, to produce a certain duty cycle. Operation of the non-inverting buckboost converter in boost mode may involve keeping the first switch, SW1, on (i.e., closed) and modulating the second switch, SW2. In an embodiment, the first and second switches, SW1 and SW2, are controlled in response to the control signal, control1 (see FIG. 1). Although a particular embodiment of a non-inverting buckboost converter is described with reference to FIG. 3A, other embodiments of a non-inverting buckboost converter may be used in the power converter system described herein. For example, FIG. 3B depicts another embodiment of a non-inverting buckboost converter 304B in which the diodes, D1 and D2, are replaced with switches, SW3 and SW4. Using a non-inverting buckboost converter with four switches as shown in FIG. 3B, it is possible to store additional energy into the inductor, L, in order to achieve soft switching over a wider range of Vbus and Vrect. For example, by controlling the switches when the current reverses, negative inductor currents can be used to charge the parasitic capacitance of the switching nodes, which enables soft switching for a wider range of Vbus and Vrect than with the non-inverting buckboost converter of FIG. 3A. Storing additional energy into the inductor, L, may enable further optimizing total efficiency and may slightly change the point where the non-inverting buckboost converter changes between switching (e.g., the switching being actively toggled) and non-switching (e.g., the switches set in fixed states). For example, in buck mode the non-inverting buckboost converter is effectively turned off (e.g., not converting energy) when switches SW1 and SW2 are kept off and in boost mode the non-inverting buckboost converter is effectively turned off (e.g., not converting energy) when switches SW2 and SW4 are kept off. In an embodiment, it may be desirable to use a small (and relatively inexpensive) capacitor after the rectifier 106 because the voltage source 310 is not a DC voltage but follows more or less the time depending shape of the mains.

Using a non-inverting buckboost converter 104 in conjunction with an LLC resonant converter 102 and controlling the non-inverting buckboost converter as a function of the ratio between the bus voltage, Vbus, and the output voltage, Vout, of the LLC resonant converter enables the bus voltage, Vbus, to be set over a range, including a region below the peak of the AC mains voltage, which maintains the ratio between the bus voltage, Vbus, and the output voltage, Vout, at a desired value. When the rectified AC mains voltage is low (e.g., Vrect≈80–120V) and a large output voltage, Vout, is desired, the boost action of the non-inverting buckboost converter can be used by keeping the first switch, SW1, continuously on to drive the bus voltage, Vbus, above the peak of the AC mains. When the rectified AC mains voltage is high, the buck or boost action of the non-inverting buckboost converter can be used depending on the desired bus voltage, Vbus. If needed, power factor correction is also possible using the non-inverting buckboost converter.

Figure 4:
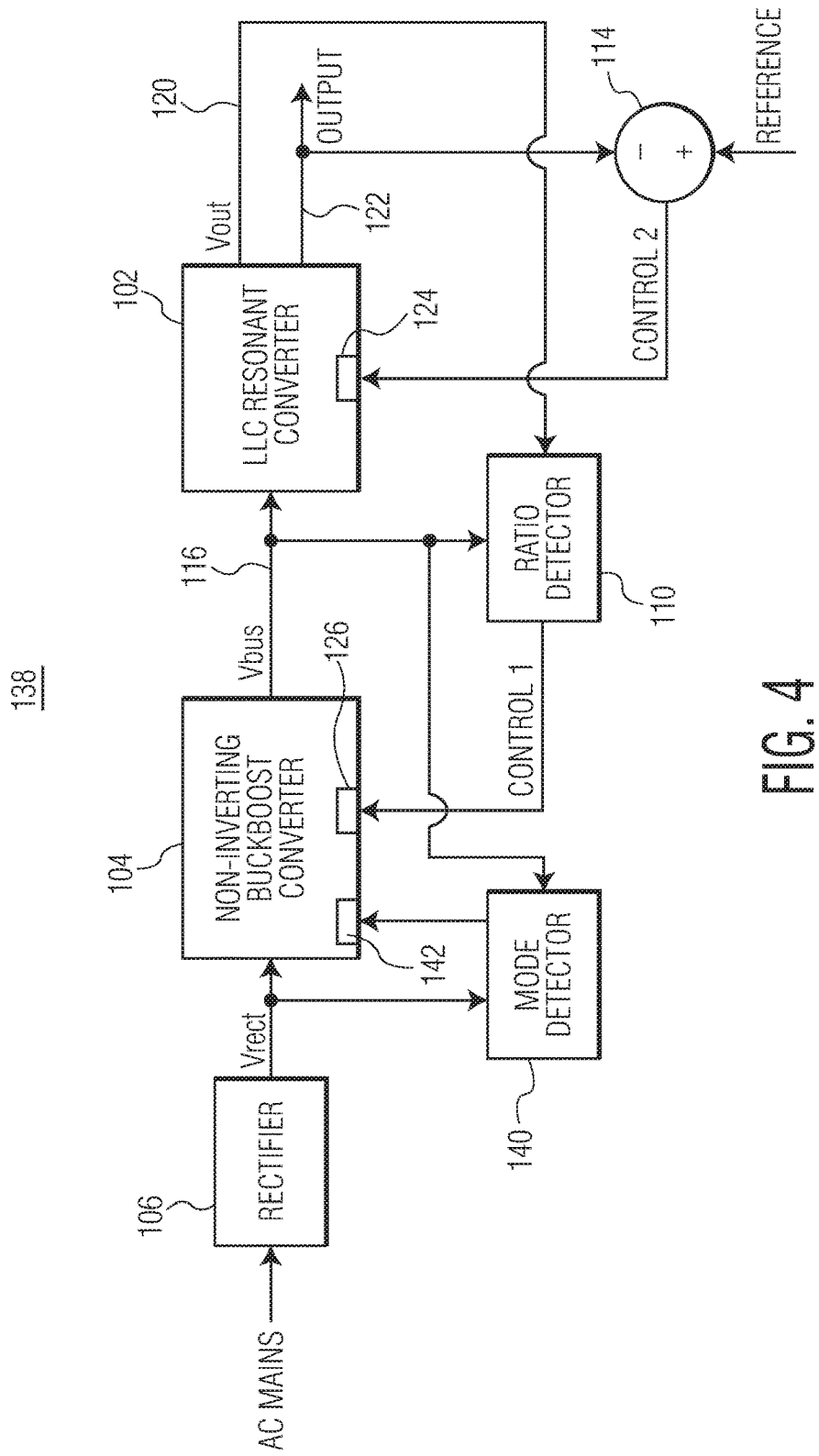
FIG. 4 depicts an embodiment of the power converter system of FIG. 1 with the addition of a mode detector.
Figure 5:
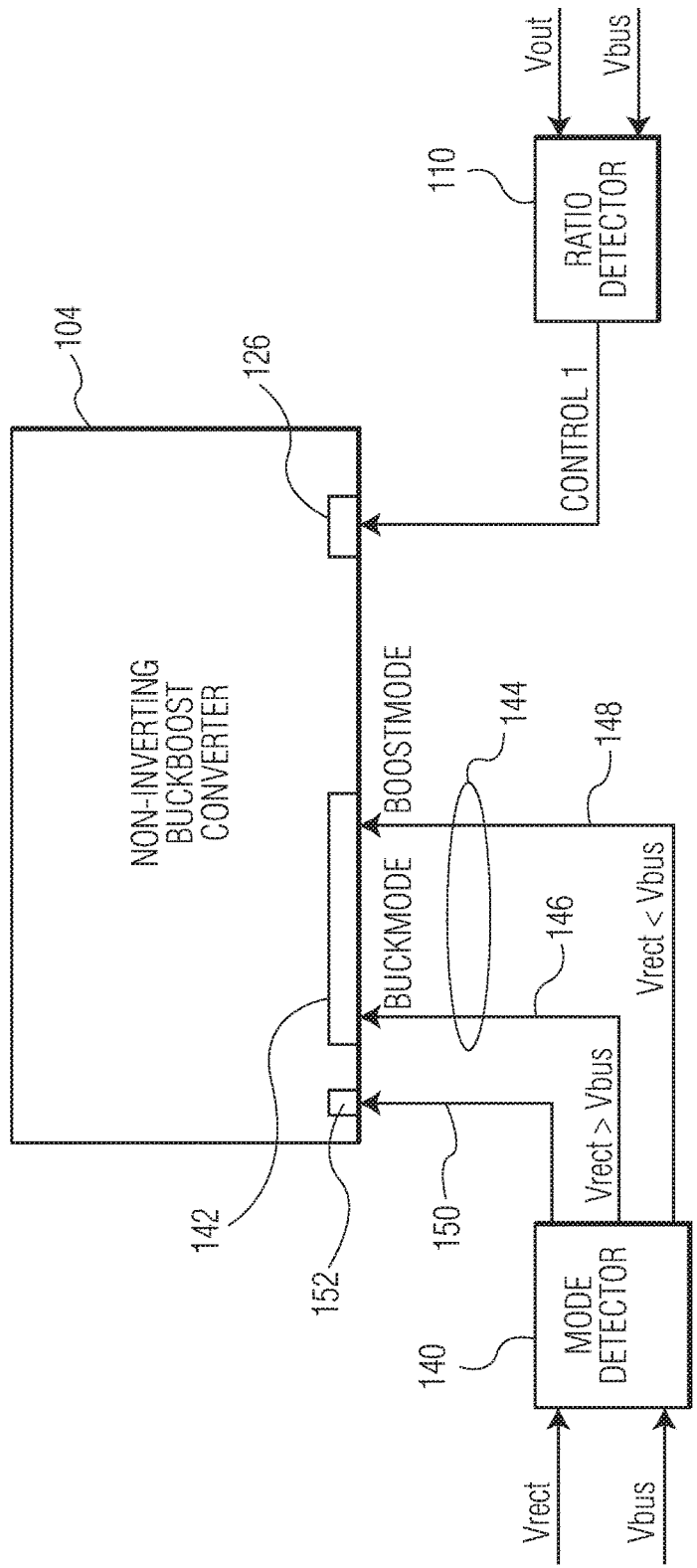
FIG. 5 depicts an expanded view of the non-inverting buckboost converter, the ratio detector, and the mode detector of FIG. 4.
Figure 6:
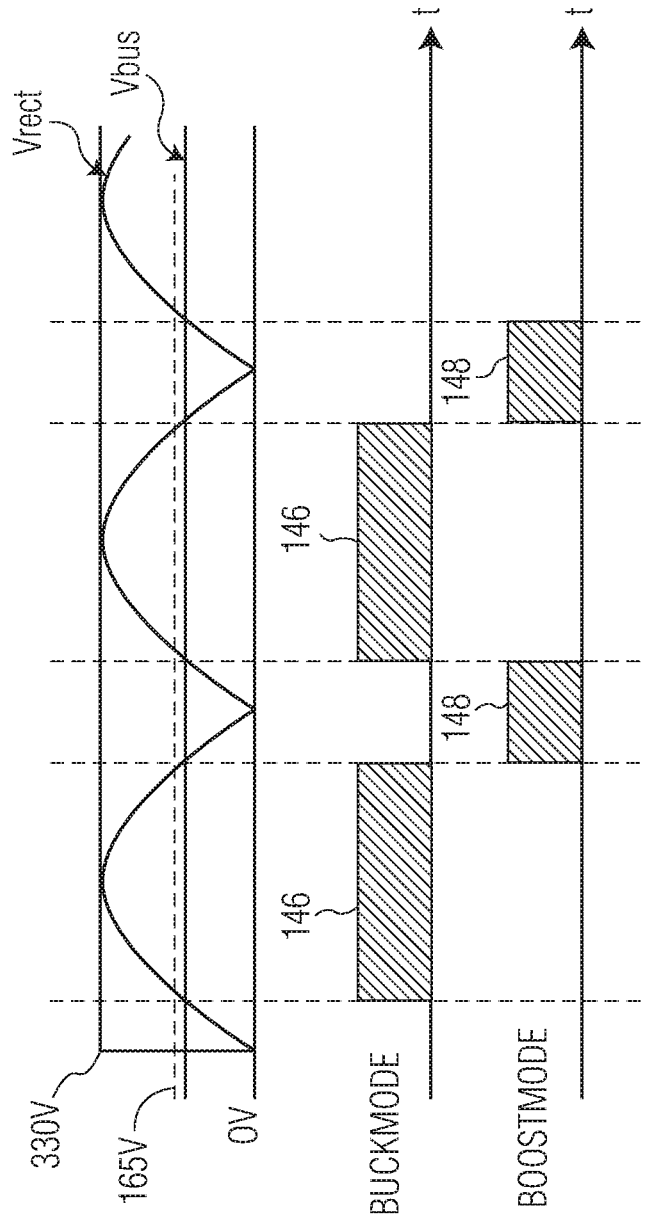
FIG. 6 illustrates an example of the state of the mode control signal relative to the magnitude of the rectified AC mains voltage, Vrect, and the bus voltage, Vbus, as a function of time.

In addition to controlling the non-inverting buckboost converter 104 as a function of the ratio between the bus voltage, Vbus, and the output voltage, Vout, of the LLC resonant converter 102, it may be desirable to control the non-inverting buckboost converter to optimize the efficiency of the non-inverting buckboost converter. For example, the mode of the non-inverting buckboost converter may be controlled in response to phase of the AC mains voltage and/or in response to the amplitude of the AC mains voltage relative to the bus voltage. FIG. 4 depicts an embodiment of a power converter system 138, which is similar to the power converter system 100 of FIG. 1, with the addition of a mode detector 140. The mode detector receives the bus voltage, Vbus, and the rectified AC mains voltage, Vrect, as inputs and provides a mode control signal to the non-inverting buckboost converter at a mode control input 142. FIG. 5 depicts an expanded view of the non-inverting buckboost converter 104, the ratio detector 110, and the mode detector 140 of FIG. 4. As illustrated in FIG. 5, the mode detector receives as input the rectified AC mains voltage, Vrect, and the bus voltage, Vbus, and the ratio detector receives as input the output voltage, Vout, and the bus voltage, Vbus. In an embodiment, the mode detector outputs a mode control signal 144 with a component 146 that indicates buck mode when Vrect>Vbus and outputs the mode control signal with a component 148 that indicates boost mode when Vrect<Vbus. The ratio detector outputs a control signal, control1, as described above. FIG. 6 illustrates an example of the state of the mode control signal relative to the magnitude of the rectified AC mains voltage, Vrect, and the bus voltage, Vbus, as a function of time. As illustrated in FIG. 6, the mode control signal indicates buck mode when the rectified AC mains voltage is greater than the bus voltage, Vrect>Vbus, and the mode control signal indicates boost mode when rectified AC mains voltage is less than the bus voltage, Vrect<Vbus.

Additionally, power conversion may be stopped in the non-inverting buckboost converter 104 around the zero crossing of the AC mains or in regions where hard switching would occur in the non-inverting buckboost converter. In both cases, it may be desirable to stop power conversion in the non-inverting buckboost converter such that power is only converted during a time window where efficiency is highest. In an embodiment, hard switching can be allowed up to a certain degree until the hard switching begins to significantly influence efficiency (e.g., when the voltage across the switches SW1 and SW2 is larger than 50V at the moment that the switch is turned on). Hard switching also exhibits steep dv/dt and di/dt characteristics, which can cause electromagnetic interference (EMI). Therefore, it may be desirable to avoid or limit hard switching when possible. As used herein, "soft" (e.g., zero voltage) switching relates to a switch that is turned on (i.e., closed or enabled) at the moment the voltage over the switch is low (e.g., at or near zero volts) due to oscillation, such that switching losses are relatively low, and "hard" switching relates to having to take down the voltage over the switch to turn on the switch (i.e., close or disable), which induces relatively high switching losses as the dissipated energy equals $0.5 \times C \times Vds^2$, so losses increase with the square of the voltage across the switch at turn on. In an embodiment, the mode detector 140 may provide an on/off signal 150 to the non-inverting buckboost converter at on/off input 152 to control the whether or not the non-inverting buckboost converter performs power conversion (e.g., to interrupt switching within the non-inverting buckboost converter). For example, turning "off" the non-inverting buckboost converter may involve halting switching of the switches during buck or boost mode in order to prevent power conversion from occurring under worse efficiency conditions or under conditions where much audible noise would be generated such as close to the zero crossing of the AC mains or at Vrect just above Vbus in buck mode.

Techniques for operating a non-inverting buckboost converter, such as the non-inverting buckboost converters 304A and 304B described with reference to FIGS. 3A and 3B, to improve efficiency of the non-inverting buckboost converter are described below with reference to FIGS. 7A-7E and FIGS. 8A-8D. In an embodiment, the non-inverting buck-boost converter is controlled to select the buck or boost mode depending on the momentary phase of the rectified AC mains voltage, Vrect. FIGS. 7A-7E illustrate several moments within a rectified AC mains voltage half cycle and effects of using the buck or boost action of the non-inverting buckboost converter. In practice, part of an AC mains filter, which is located after the bridge rectifier and may include inductors and capacitors to block high frequency noise from being transferred back to the rectifier, may cause the rectified mains voltage, Vrect, around the zero crossings to remain above 0V for low power levels due to capacitances remaining partly charged.

Figure 7A:
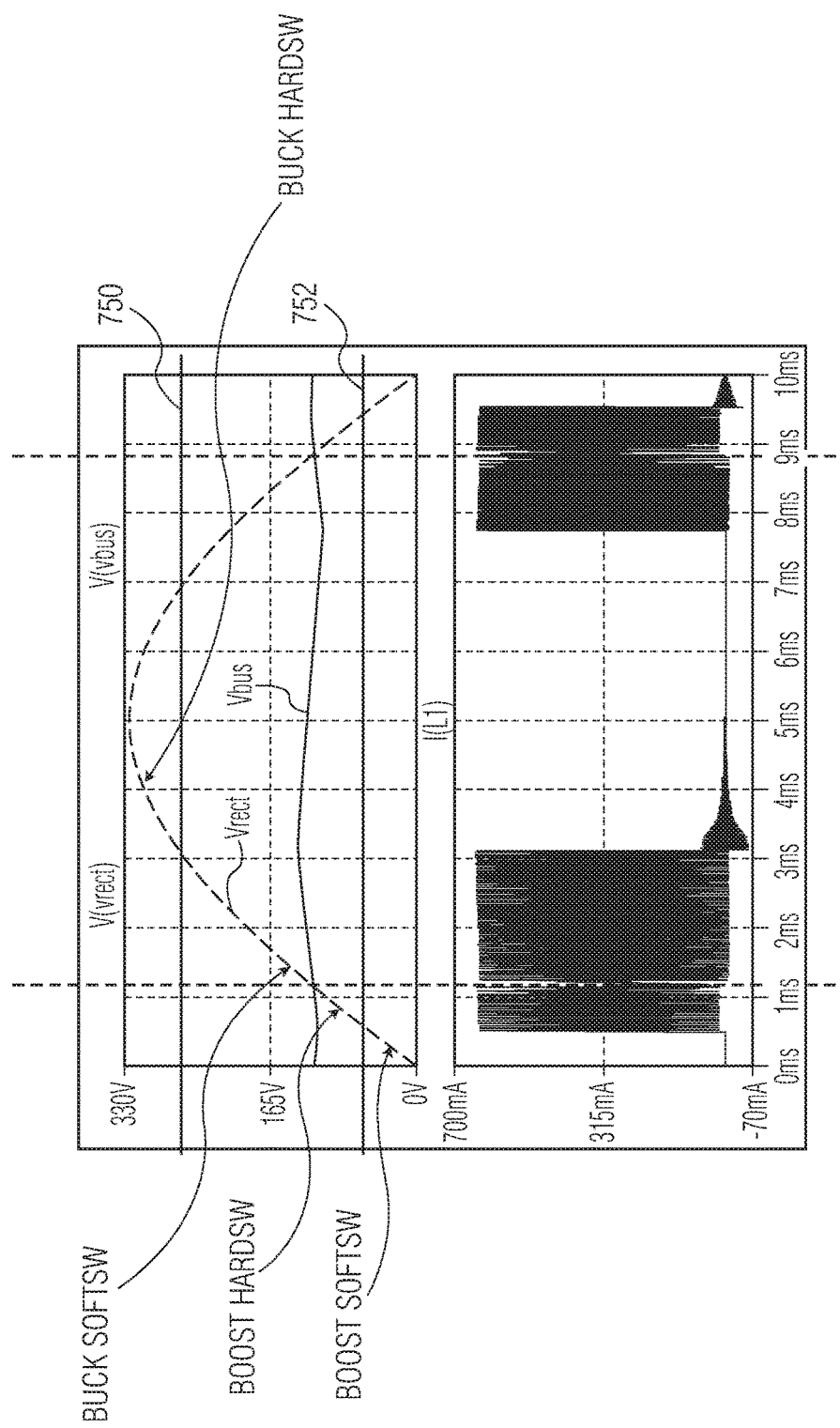
FIG. 7A illustrates the rectified AC mains voltage, Vrect, and the bus voltage, Vbus, of a non-inverting buckboost converter in a possible operation mode where boost action takes place for rectified mains voltages, Vrect, between a minimum and a maximum.

FIG. 7A shows a possible operation mode according one embodiment, where boost action takes place for rectified mains voltages, Vrect, between a minimum and a maximum, where the minimum is set based on an acceptable efficiency around the AC mains zero crossing, while the maximum is set according to an acceptable amount of hard switching losses or the rectified mains voltage, Vrect, reaching the bus voltage, Vbus. In the embodiment of FIG. 3B, in which D2 is replaced by switch SW4, hard switching of switch SW2 can be prevented, such that the maximum Vrect to maintain boost action can be different compared to the converter of FIG. 3A. Buck action takes place for Vrect>Vbus until hard switching occurs with an acceptable amount of losses. In buck mode, hard switching can be improved by replacing the diodes D1 and D2 with switches as shown in FIG. 3B, such that the minimum Vrect to maintain buck action can be lower compared to the converter of FIG. 3A. FIG. 7A shows the rectified AC mains, Vrect, (e.g., 1 half mains period shown) relative to the bus voltage, Vbus. The horizontal lines 750 and 752 identify example limits between soft switching and hard switching. The lower horizontal line 752 shows an example limit for soft switching/hard switching for the boost action (e.g., Vrect<Vbus/2) and the upper horizontal line 750 shows an example limit for soft switching/hard switching for the buck action (e.g., Vrect>2×Vbus). In the embodiment of FIG. 3B, the limit for soft switching/hard switching for the buck action may be lower than indicated in FIG. 7A as the diode D2 goes into reverse and prevents the parasitic capacitance of diode D1 to be sufficiently charged. This is solved in the embodiment of FIG. 3B because SW4 is kept conducting in buck mode.

Figure 7B:
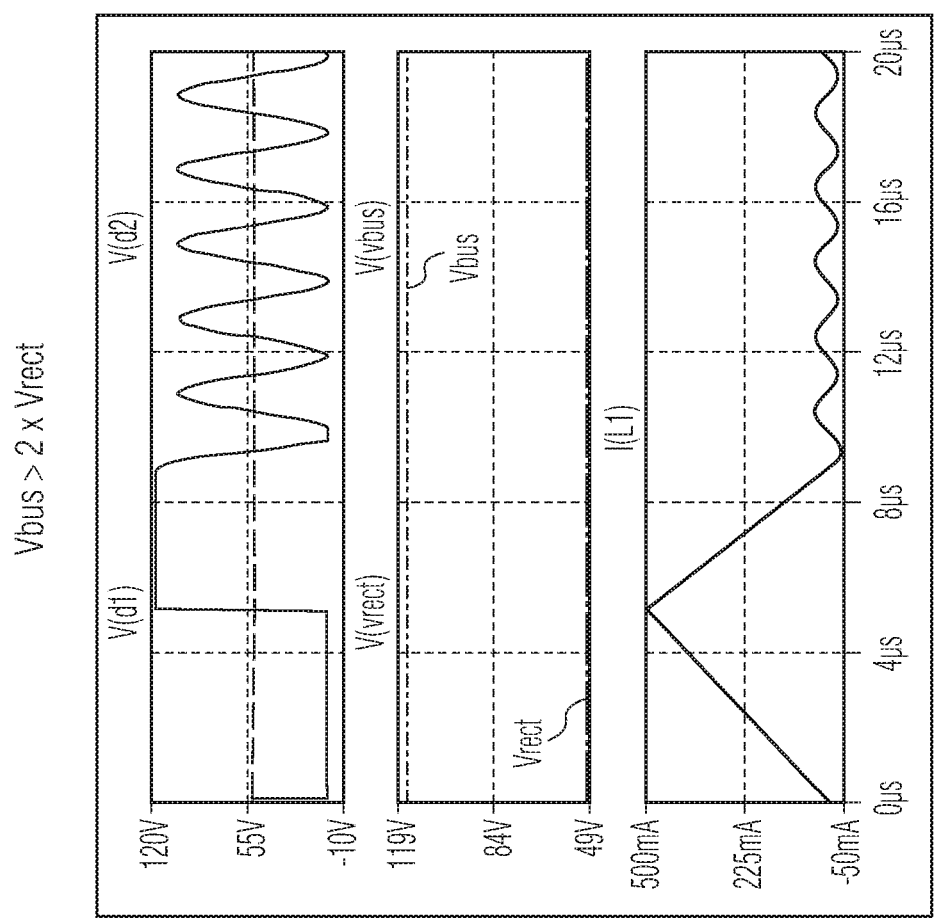
FIG. 7B depicts a boost mode operation with soft switching.

When the rectified AC mains voltage is smaller than Vbus, boost action can take place. FIG. 7B depicts a boost mode operation with soft switching. In particular, FIG. 7B depicts voltage, Vd1, being equal to the rectified mains voltage, Vrect, as the first switch, SW1, is on (i.e., closed). Vd2 is the voltage at the drain of the second switch, SW2. After the end of the secondary stroke, the second switch, SW2, is turned off (i.e., opened) and the second diode, D2, is also not conducting. This gives a voltage ringing that allows for soft switching as long as the bus voltage, Vbus, is larger than 2×Vrect. In boost mode, switch 1, SW1, is continuously on, while switch 2, SW2, is switched on and off to convert energy to the output voltage, Vbus. Soft switching is illustrated as Vd2 rings down to 0V at t=10 usec. So then it is possible to turn on switch 2, SW2, at a moment that the voltage across switch 2, SW2, is near 0V, thus producing little to no losses at switch on.

Figure 7C:
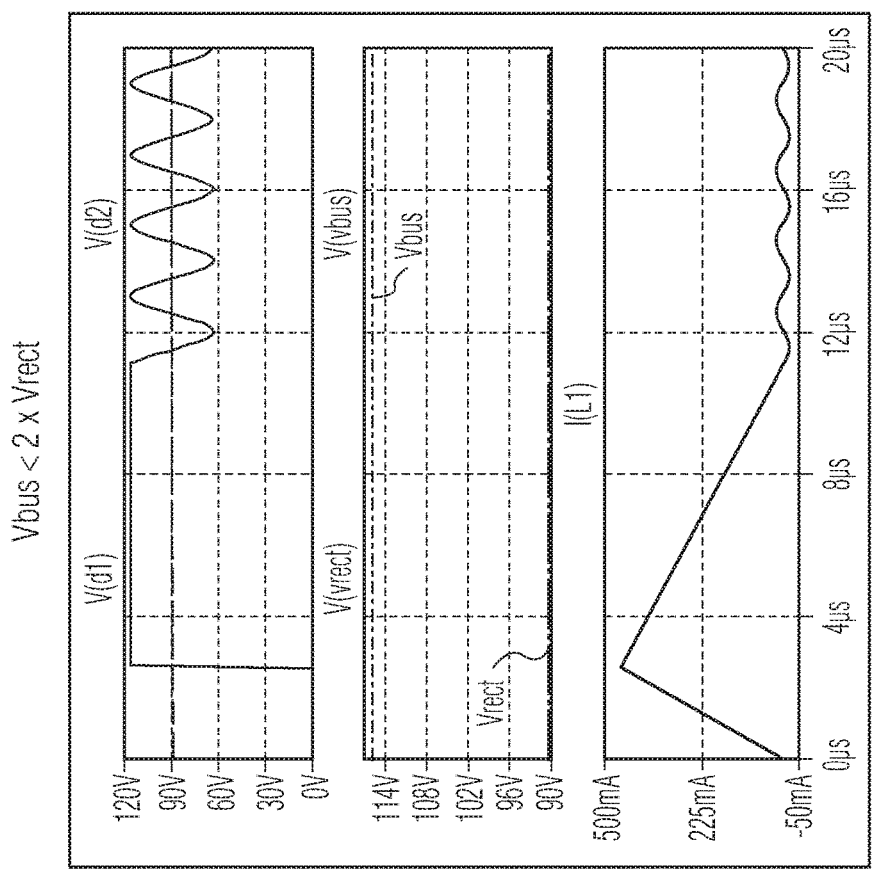
FIG. 7C depicts a boost mode operation with hard switching.

FIG. 7C depicts a boost mode operation with hard switching. In particular, FIG. 7C depicts the case in which boost action takes place with partly hard switching while the bus voltage, Vbus, is smaller than 2×Vrect. With reference to FIG. 7C, this can be seen as Vd2 does not ring down to 0V. In this example, Vd2 rings to approximately 60V. So then it is only possible to turn on switch 2, SW2, at a moment that the voltage across switch 2, SW2, is 60V in the best case, which results in some switching losses. In the embodiment of FIG. 3B, it is possible to maintain soft switching. In this case, the switch is kept on for an interval after the current in the inductor, L, reaches 0 (e.g., at around t=11 us in FIG. 7C) in order to build up negative current in the inductor, L, basically storing energy back from Vout to the inductor, L. After opening the switch, the energy stored in the inductor, L, is then used to discharge Vd2 so then it can ring down to 0V with the proper amount of energy stored.

Figure 7D:
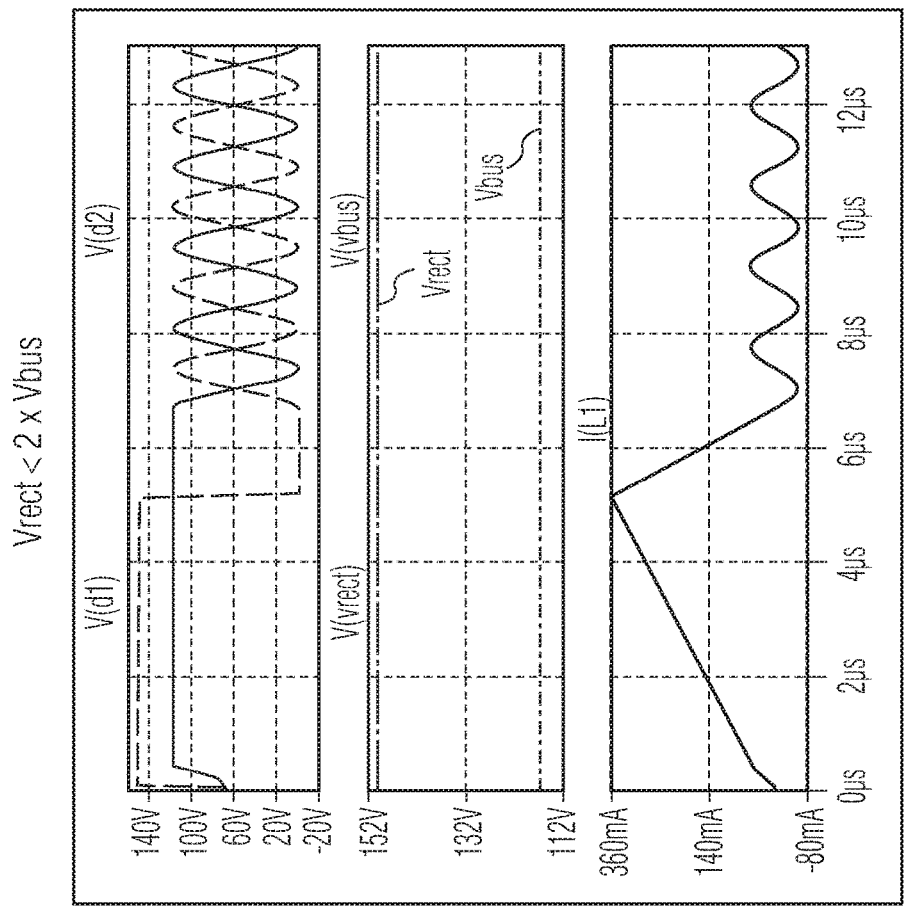
FIG. 7D depicts a buck mode operation with soft switching.

FIG. 7D depicts a buck mode operation with soft switching. In buck mode, the second switch, SW2, is off (i.e., open and not conducting). In the embodiment of FIG. 3B, switch SW4 can remain conducting such that soft switching occurs for switch SW1 when the rectified mains voltage, Vrect, is below 2×Vbus. In the embodiment of FIG. 3A, the diode D2 stops conducting when the current in the inductor, L, reaches 0, as shown in FIG. 7D. In this case, hard switching for switch SW1 already occurs for Vrect above Vbus. In the embodiment of FIG. 3B, with switch SW4 being continuously on in buck mode, such a situation can be avoided. In an embodiment, for true buck mode operation, D2 should be shorted. In the example of FIG. 7D, it is not possible to keep D1 conducting after the current reaches 0A, (e.g., at t=6.5 usec). In the embodiment of FIG. 3B, D1 is replaced by switch SW3 and the switch is kept on for a short interval after the current in the inductor, L, reaches 0. In this way, a slightly negative current occurs in the inductor, L, putting extra energy in the inductor, L, from the rectified mains voltage, Vrect. After turning off the switch SW3, the additional energy is used to charge the drain node of SW3 to Vrect, such that the first switch SW1 can be turned on under soft switching conditions also for Vrect>2×Vbus during the buck mode operation.

Figure 7E:
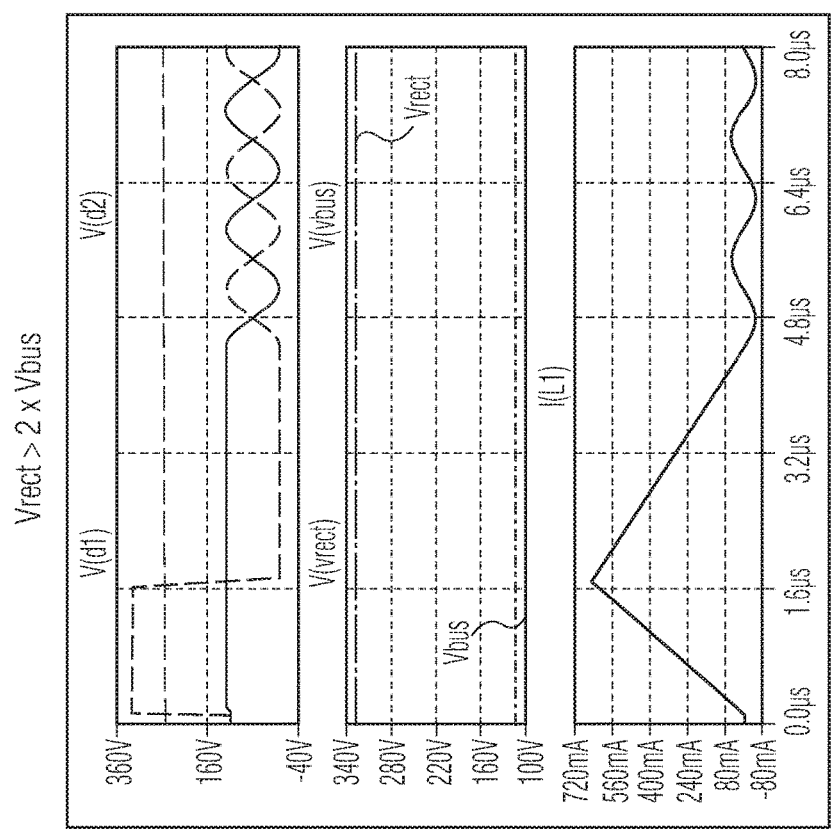
FIG. 7E depicts a buck mode operation with hard switching.

FIG. 7E depicts buck mode operation with hard switching. In the example of FIG. 7E, hard switching occurs when the rectified mains voltage, Vrect, is above 2×Vbus. As mentioned above, soft switching conditions for Vrect>2×Vbus during the buck mode operation can be maintained by replacing the diode D1 with a switch, SW3, and keeping the switch on for a short time after the current in the inductor, L, reverses. Then, the diode D2 is also replaced by switch SW4 and the switch SW4 is kept on continuously during buck mode.

Figure 8A:
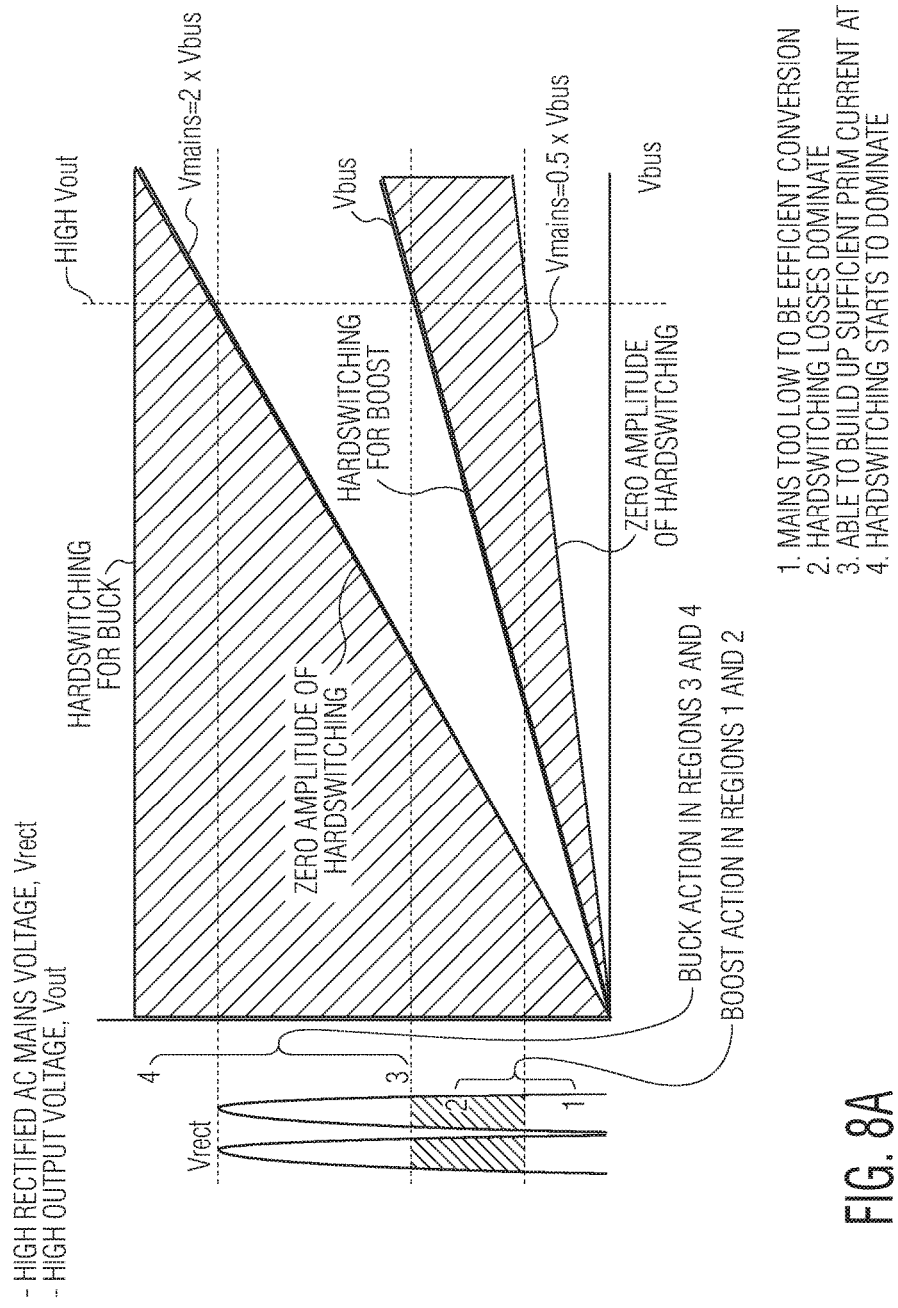
FIG. 8A illustrates regions where hard and soft switching occurs depending on the bus voltage, Vbus, and the rectified mains voltage, Vrect, in a case in which the rectified AC mains voltage, Vrect, is high and the output voltage, Vout, is high.

FIGS. 8A-8D illustrate regions where hard and soft switching occurs depending on the bus voltage, Vbus, and the rectified mains voltage, Vrect. FIG. 8A depicts a case in which the rectified AC mains voltage, Vrect, is high and the bus voltage, Vbus, is high. As used herein, the soft switching/hard switching limits depend on whether the non-inverting buckboost converter includes the diodes, D1 and D2, as shown in FIG. 3A or the switches, SW3 and SW4, as shown in FIG. 3B. In an embodiment, the hard switching limit for buck mode of Vrect>2×Vbus holds true when diode D2 is replaced with switch SW4 that is continuously on when in buck mode. Four regions of the rectified AC mains are identified in FIG. 8A and buck action occurs when the rectified AC mains voltage, Vrect, is in region 3 or 4 and boost action occurs when the rectified AC mains voltage, Vrect, is in region 1 or 2. In the lower part of region 1, the rectified AC mains voltage, Vrect, is too low for efficient conversion, so it is an option to prevent switching in this part of region 1. In region 2, hard switching losses dominate. In region 3, buck mode can be applied, although in the lower part of region 3 a very long buck first interval (rising current) can occur, which may cause the switching frequency to become audible which is often not allowed. Therefore, the switching can be prevented if desired. For the upper part of region 3, it is possible to build up sufficient primary current at a frequency above about 20 hHz. In region 4, hard switching starts to dominate. It is therefore an option to use the converter in buck or boost mode or keep the converter off (e.g., halt switching of the switches, SW1, SW2, SW3, and SW4) depending on the actual region or position within a region and also depending on the configuration (e.g., FIG. 3A in which D1 and D2 exist or FIG. 3B in which SW3 and SW4 are used to maintain soft switching by allowing reversed current buildup in the inductor, L).

Figure 8B:
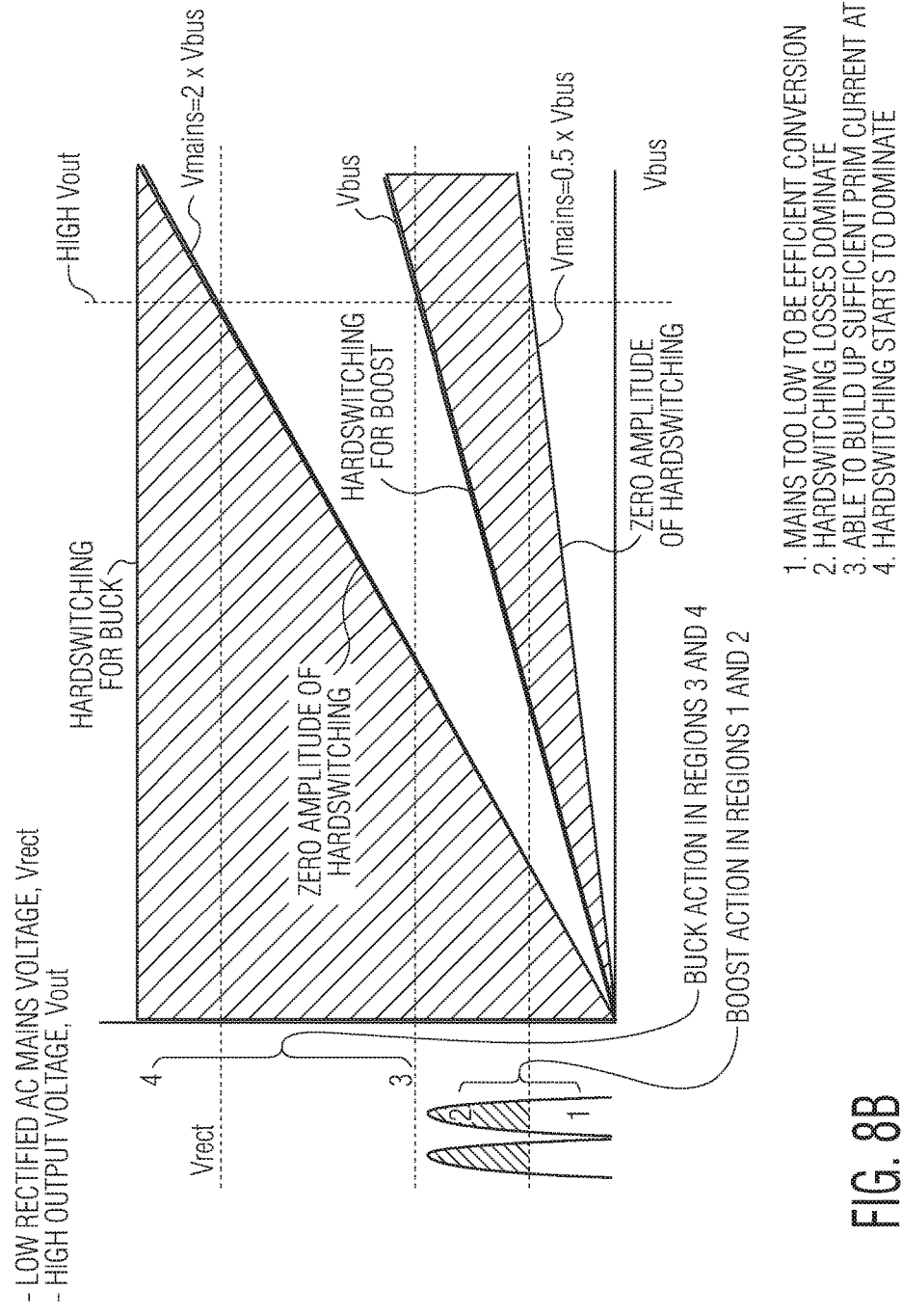
FIG. 8B illustrates regions where hard and soft switching occurs depending on the bus voltage, Vbus, and the rectified mains voltage, Vrect, in a case in which the rectified AC mains voltage, Vrect, is low and the output voltage, Vout, is high.

FIG. 8B depicts a case in which the rectified AC mains voltage, Vrect, is low and the bus voltage, Vbus, is high. Four regions of the rectified AC mains are identified in FIG. 8B and buck action occurs when the rectified AC mains, Vrect, is in region 3 or 4 and boost action occurs when the rectified AC mains, Vrect, is in region 1 or 2. In the case of FIG. 8B, boost action will be used generate the desired bus voltage, Vbus. In region 1, the rectified AC mains is too low for efficient conversion. In region 2, hard switching losses dominate. In region 3, it is possible to build up sufficient primary current at a frequency above about 20 hHz. In region 4, hard switching starts to dominate.

Figure 8C:
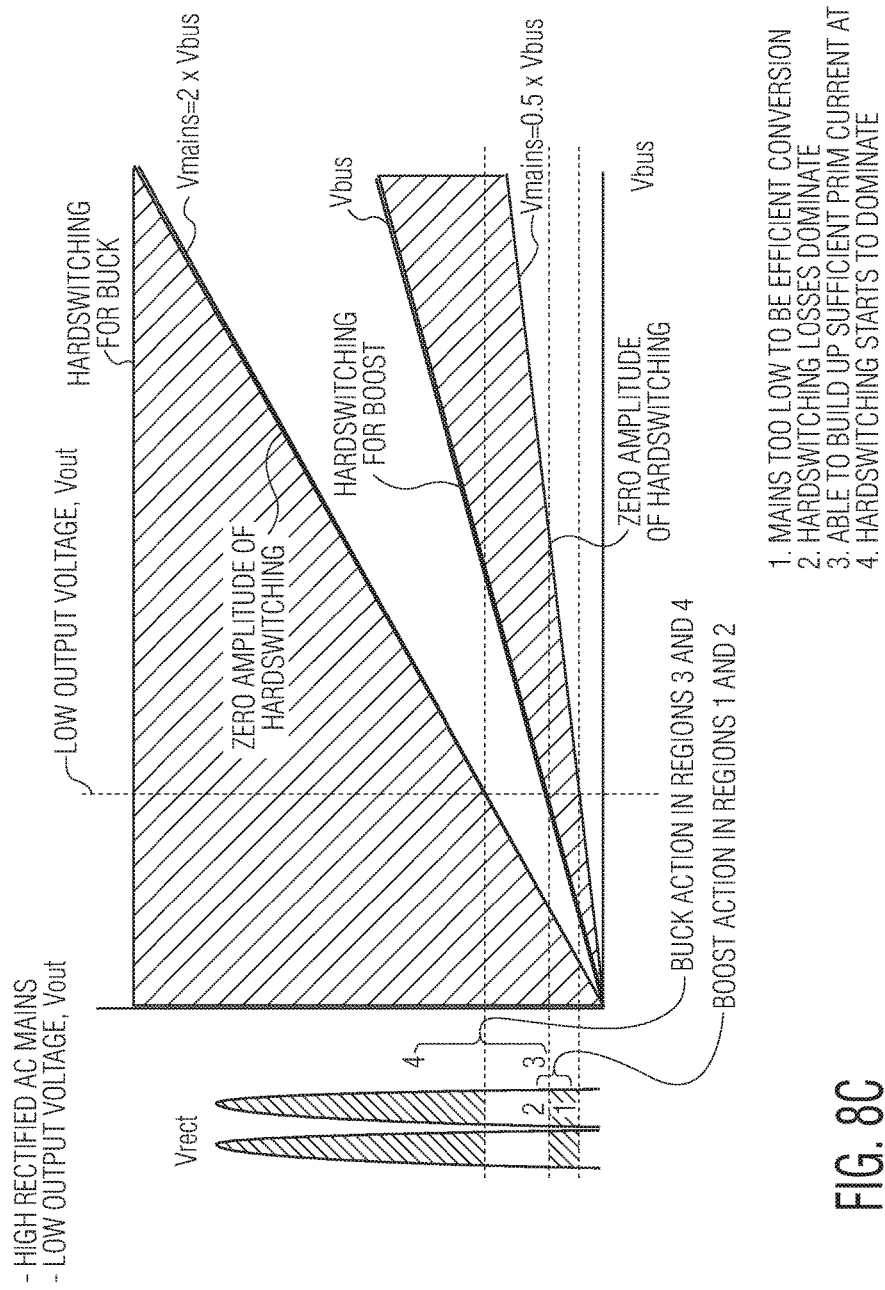
FIG. 8C illustrates regions where hard and soft switching occurs depending on the bus voltage, Vbus, and the rectified mains voltage, Vrect, in a case in which the rectified AC mains voltage, Vrect, is high and the output voltage, Vout, is low.

FIG. 8C depicts a case in which the rectified AC mains voltage, Vrect, is high and the bus voltage, Vbus, is low. Four regions of the rectified AC mains are identified in FIG. 8C and buck action occurs when the rectified AC mains, Vrect, is in region 3 or 4 and boost action occurs when the rectified AC mains, Vrect, is in region 1 or 2. In the case of FIG. 8C, buck and boost action will be used generate the desired bus voltage, Vbus. In region 1, the rectified AC mains is too low for efficient conversion. In region 2, hard switching losses dominate. In region 3, it is possible to build up sufficient primary current at a frequency above about 20 hHz. In region 4, hard switching starts to dominate.

Figure 8D:
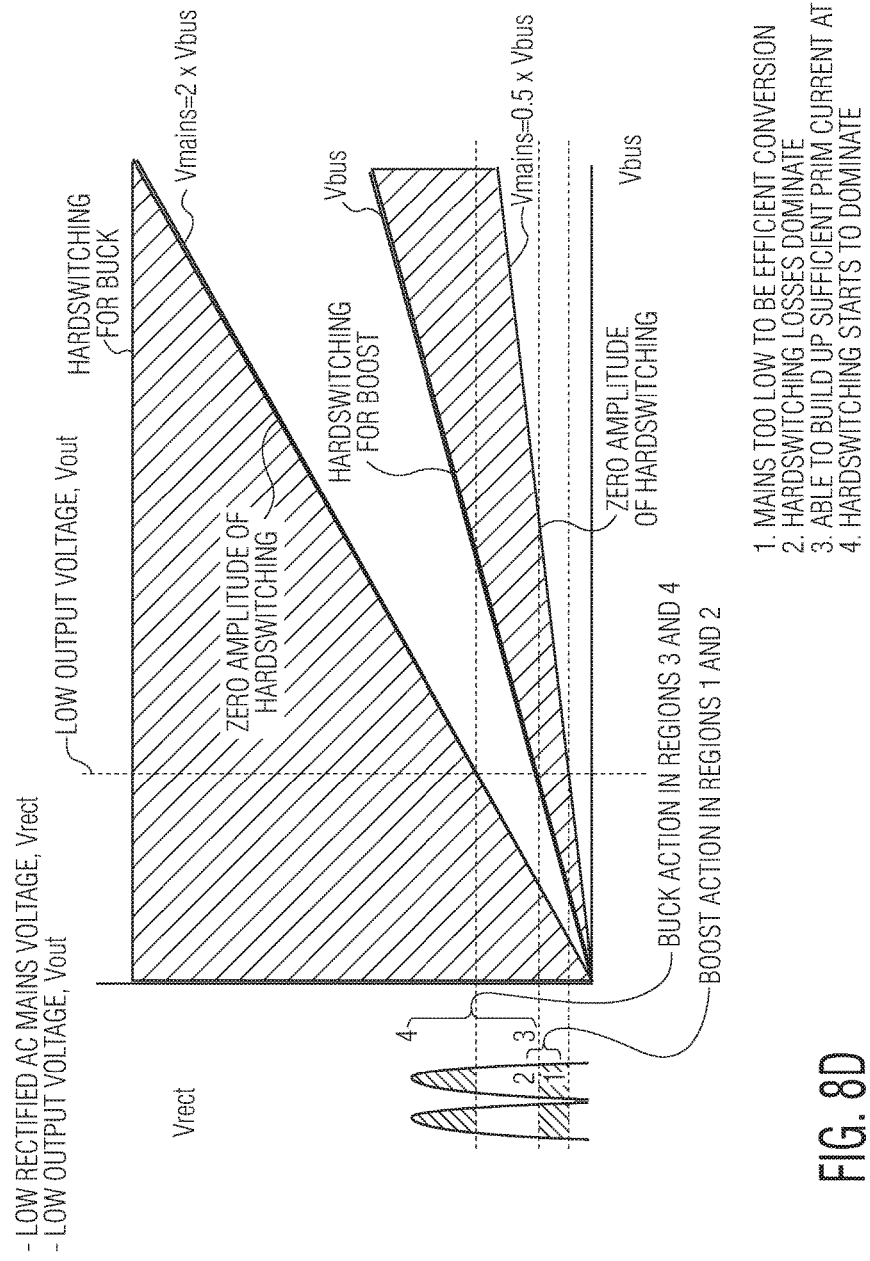
FIG. 8D illustrates regions where hard and soft switching occurs depending on the bus voltage, Vbus, and the rectified mains voltage, Vrect, in a case in which the rectified AC mains voltage, Vrect, is low and the output voltage, Vout, is low.

FIG. 8D depicts a case in which the rectified AC mains voltage, Vrect, is low and the bus voltage, Vbus, is low. Four regions of the rectified AC mains are identified in FIG. 8D and buck action occurs when the rectified AC mains voltage, Vrect, is in region 3 or 4 and boost action occurs when the rectified AC mains, Vrect, is in region 1 or 2. In the case of FIG. 8D, buck and boost action will be used to generate the desired bus voltage, Vbus. In region 1, the rectified AC mains is too low for efficient conversion. In region 2, hard switching losses dominate. In region 3, it is possible to build up sufficient primary current at a frequency above about 20 hHz. In region 4, hard switching starts to dominate.

In an embodiment, buck or boost action or no power conversion is chosen as a function of the phase angle of the AC mains such that hard switching is prevented as much as possible while finding an optimum combination between hard switching losses, RMS losses, and an acceptable switching frequency above the audible limits. In an embodiment, the second switch, SW2, of the non-inverting buckboost converter controls the boost action around the zero crossings of the AC mains up to approximately Vrect=0.5× Vbus or even up to Vrect=Vbus, depending on the resulting optimum from the several loss mechanisms. For Vrect>0.5× Vbus, buck action can take place, taking into account that at Vrect=2×Vbus, hard switching starts to occur. Therefore, in an embodiment, buck action stops when Vrect>k×Vbus, where k is a constant of approximately 2. As hard switching losses become dominant depending on both Vrect and Vbus, replacement of the diode, D2, by the switch, SW4, (which is turned on continuously in buck mode), will enable setting the optimum scaling factor, k in practical applications as a compromise between several loss mechanisms. In an embodiment, the optimum value for k primarily depends on Vbus and is approximately 1.5 for Vbus=100V and approximately 1.05 for Vbus=400V.

For applications above 75 Watts where power factor correction is needed, a combination of buck and boost action over the AC mains half cycle can be performed using an embodiment of the invention according to the description above, where the on time of both switches, SW1 or SW2, can be set in combination with period time in boundary conduction mode or discontinuous mode. Additionally, the switch conduction times can be defined in combination with the phase angle of the AC mains voltage in order to maintain a sufficient power factor and/or reduction of mains harmonics.

Figure 9:
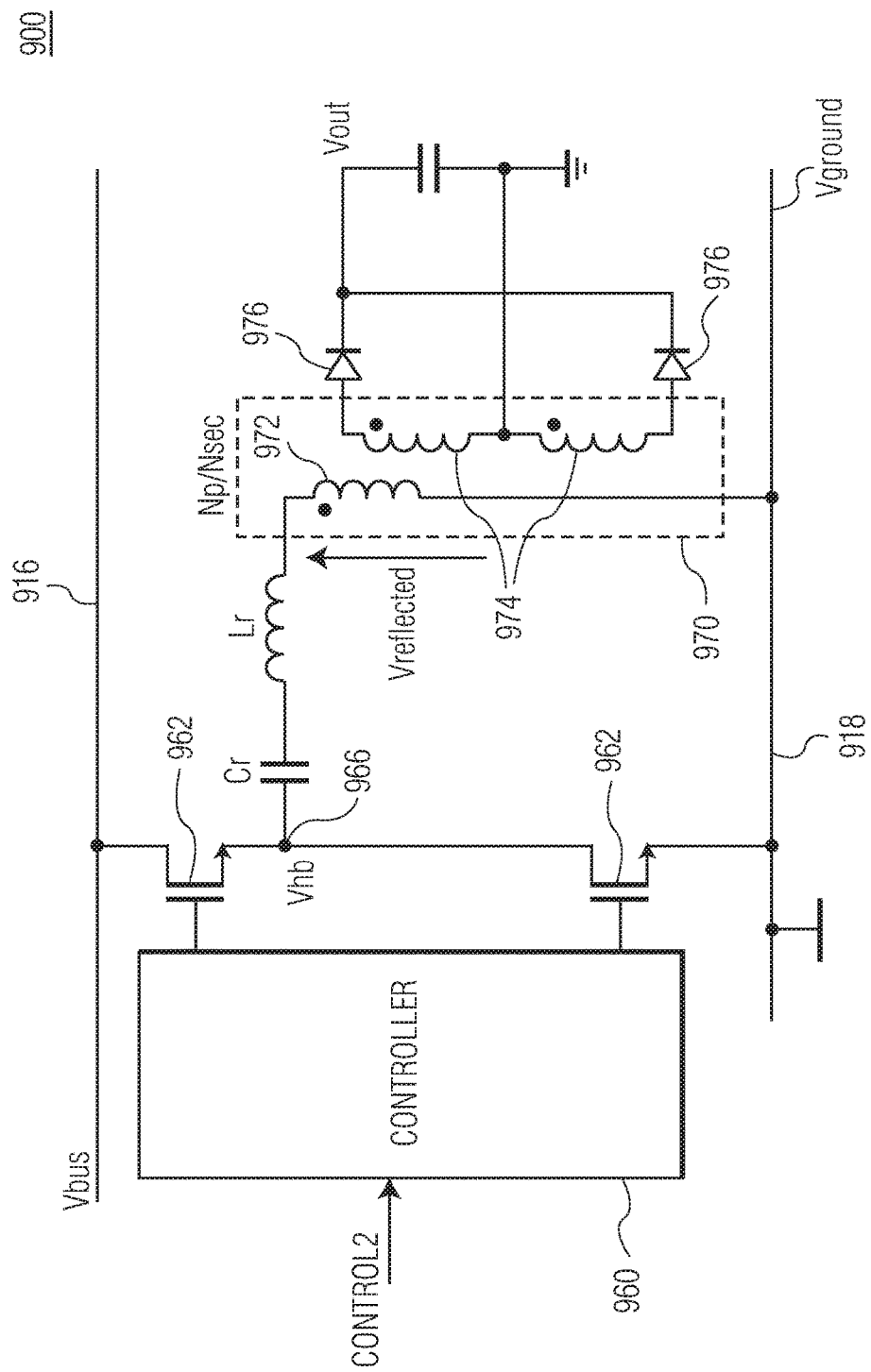
FIG. 9 depicts an embodiment of the LLC resonant converter between two voltage rails, the bus voltage, Vbus and ground, Vground.

FIG. 9 depicts an embodiment of the LLC resonant converter 102 of FIG. 1. The LLC resonant converter 900 depicted in FIG. 9 is connected between two voltage rails, a bus voltage rail 916 at the bus voltage, Vbus and a ground voltage rail 918 at ground, Vground. In the embodiment of FIG. 9, the LLC resonant converter includes a controller 960, two switches 962, a half node bridge 966, a resonant capacitor, Cr, a resonant inductor, Lr, a transformer 970 that includes a primary winding 972 and secondary windings 974, and diodes 976. In an embodiment, the turns ratio of the windings of the transformer is expressed as Np/Nsec, where Np is the number of turns in the primary winding 972 and Nsec is the number of turns in the secondary winding 974. In an embodiment, the LLC resonant converter can be adjusted in response to control signal, control2, which is generated in response to a comparison between the output of the LLC resonant converter and the reference as shown in FIG. 1. For example, parameters of the LLC resonant converter that may be adjusted include a capacitor voltage or current level of the LLC resonant converter and/or a switching frequency of the switches of the LLC resonant converter. In an embodiment, the LLC resonant converter may be operated in a low power mode when an output of the LLC resonant converter falls below a power level threshold. For example, a low power mode uses a particular switching sequence of the switches in order to get a better optimum between magnetizing losses in the transformer and power converted, which produces a higher efficiency at low loads.

As explained above, the non-inverting buckboost converter is controlled by the ratio detector by sensing both the output voltage, Vout, and the bus voltage, Vbus. As the output voltage, Vout, is at the other side of the mains isolation, it may be desirable to sense the output voltage, Vout, across a primary auxiliary winding of the LLC resonant converter. Thus, in an embodiment, the output voltage, Vout, is measured across the primary auxiliary winding of the LLC resonant converter.

Figure 10:
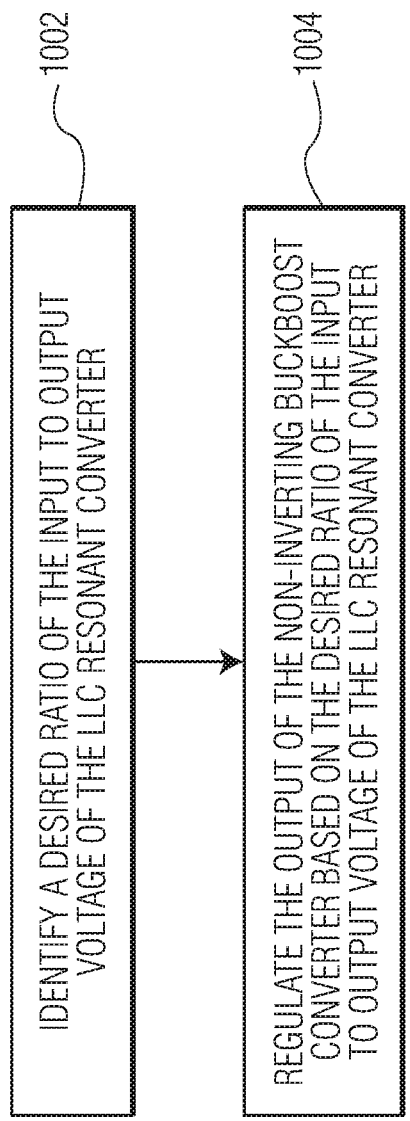
FIG. 10 is a process flow diagram of a method for operating a power converter system that includes an LLC resonant converter and a non-inverting buckboost converter that is located in front of the LLC resonant converter.

FIG. 10 is a process flow diagram of a method for operating a power converter system that includes an LLC resonant converter and a non-inverting buckboost converter that is located in front of the LLC resonant converter. At block 1002, a desired ratio of the input to output voltage of the LLC resonant converter is identified. At block 1004, the output of the non-inverting buckboost converter is regulated based on the desired ratio of the input to output voltage of the LLC resonant converter. In an embodiment, the method of FIG. 10 is implemented in the power converter system as described above with reference to FIGS. 1-9.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

Although specific embodiments of the invention have been described and illustrated, the invention is not to be limited to the specific forms or arrangements of parts as described and illustrated herein. The invention is limited only by the claims.

What is claimed is:

1. A method for operating a power converter system that includes an LLC resonant converter and a non-inverting buckboost converter that is located in front of the LLC resonant converter, the method comprising:
    identifying a desired ratio of the input to output voltage of the LLC resonant converter; and
    regulating the output of the non-inverting buckboost converter based on the desired ratio of the input to output voltage of the LLC resonant converter;
    wherein regulating includes determining a ratio of the input voltage to the output voltage of the LLC resonant converter; and
    wherein regulating the output of the non-inverting buckboost converter comprises generating a control signal in response to a comparison of the determined ratio to the desired ratio.

2. The method of claim 1 further comprising regulating the non-inverting buckboost converter in response to a rectified AC mains voltage that is input to the non-inverting buckboost converter.

3. The method of claim 2 further comprising regulating the non-inverting buckboost converter in response to a phase angle of the rectified AC mains voltage.

4. The method of claim 2 further comprising regulating the buckboost converter in response to an amplitude and a phase angle of the rectified AC mains voltage.

5. The method of claim 1 further comprising halting switching of switches within the non-inverting buckboost converter in response to a rectified AC mains voltage that is input to the non-inverting buckboost converter.

6. The method of claim 1 further comprising adjusting a parameter of the LLC resonant converter in response to a comparison between the output of the LLC resonant converter and a reference to regulate the LLC resonant converter.

7. The method of claim 6 wherein adjusting a parameter of the LLC resonant converter comprises adjusting a capacitor voltage of the LLC resonant converter.

8. The method of claim 6 wherein adjusting a parameter of the LLC resonant converter comprises adjusting a frequency of the LLC resonant converter.

9. The method of claim 6 wherein adjusting a parameter of the LLC resonant converter comprises selecting a low power mode when an output of the LLC resonant converter falls below a power level threshold.

10. A method for operating a power converter system that includes an LLC resonant converter and a non-inverting buckboost converter that is located in front of the LLC resonant converter, the method comprising:
    identifying a desired ratio of the input to output voltage of the LLC resonant converter; and
    regulating the output of the non-inverting buckboost converter based on the output voltage at the LLC resonant converter to maintain the desired ratio of the input to output voltage of the LLC resonant converter;
    wherein regulating the output of the non-inverting buckboost converter comprises determining a ratio of the input voltage to the output voltage of the LLC resonant converter; and
    wherein regulating the output of the non-inverting buckboost converter comprises generating a control signal in response to a comparison of the determined ratio to the desired ratio.

11. The method of claim 10 further comprising regulating the non-inverting buckboost converter in response to a rectified AC mains voltage that is input to the non-inverting buckboost converter.

12. The method of claim 11 further comprising regulating the non-inverting buckboost converter in response to a phase angle of the rectified AC mains voltage.

13. The method of claim 11 further comprising regulating the buckboost converter in response to an amplitude and a phase angle of the rectified AC mains voltage.

14. A power converter system comprising:
    a non-inverting buckboost converter;
    an LLC resonant converter; and
    a ratio detector to detect a ratio between an input voltage of the LLC resonant converter and an output voltage of the LLC resonant converter and to provide a control signal to the non-inverting buckboost converter;
    wherein the non-inverting buckboost converter is configured to regulate the output of the non-inverting buckboost converter based on the control signal and a desired ratio of the input to output voltage of the LLC resonant converter;
    further comprising a mode detector to generate a mode control signal in response to a rectified AC mains voltage and an output voltage of the non-inverting buckboost converter.

15. The power converter system of claim 14 wherein the non-inverting buckboost converter is configured to regulate the output of the non-inverting buckboost converter to maintain the desired ratio of the input to output voltage of the LLC resonant converter.

* * * * *